United States Patent
Gordon

(10) Patent No.: US 11,436,109 B1
(45) Date of Patent: Sep. 6, 2022

(54) SYSTEMS AND METHODS FOR COMMUNICATING DATA SECURELY FOR AN ELECTRIC POWER DELIVERY SYSTEM

(71) Applicant: Schweitzer Engineering Laboratories, Inc., Pullman, WA (US)

(72) Inventor: Colin Gordon, Katy, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/462,220

(22) Filed: Aug. 31, 2021

(51) Int. Cl.
| | |
|---|---|
| G06F 11/14 | (2006.01) |
| G06F 11/20 | (2006.01) |
| G06F 11/18 | (2006.01) |
| G06F 11/08 | (2006.01) |
| H04L 101/622 | (2022.01) |
| H04L 9/40 | (2022.01) |

(52) U.S. Cl.
CPC .......... *G06F 11/2015* (2013.01); *G06F 11/08* (2013.01); *G06F 11/1443* (2013.01); *G06F 11/186* (2013.01); *H04L 63/0485* (2013.01); *H04L 2101/622* (2022.05)

(58) Field of Classification Search
CPC .... G06F 11/08; G06F 11/1443; G06F 11/186; H04L 63/0428; H04L 63/0485; H04L 2101/622
See application file for complete search history.

(56) References Cited

U.S. PATENT DOCUMENTS

| | | | |
|---|---|---|---|
| 7,729,276 B2 | 6/2010 | Akyol | |
| 11,303,568 B1* | 4/2022 | Haridas | ................... H04L 45/22 |
| 2010/0174919 A1* | 7/2010 | Ito | ........................... G06F 21/74 |
| | | | 713/192 |
| 2014/0109182 A1* | 4/2014 | Smith | ................. H04L 63/1416 |
| | | | 726/3 |
| 2015/0180954 A1* | 6/2015 | Cachin | .................... H04L 45/24 |
| | | | 709/218 |
| 2017/0195260 A1* | 7/2017 | Ma | ....................... H04L 45/7453 |
| 2018/0219798 A1* | 8/2018 | Dutil | ................... H04L 67/1097 |
| 2019/0116183 A1* | 4/2019 | Hussain | ................. H04L 63/08 |
| 2019/0173860 A1 | 6/2019 | Sankaran | |
| 2019/0305900 A1* | 10/2019 | Kaattari | ................. H04L 47/34 |
| 2019/0342101 A1 | 11/2019 | Hayes | |
| 2020/0076524 A1* | 3/2020 | Demchenko | .......... H04J 3/0667 |
| 2020/0106719 A1 | 4/2020 | Acharya | |
| 2021/0218737 A1* | 7/2021 | Bhagvath | .......... H04W 12/0433 |

OTHER PUBLICATIONS

MACsec Layer 2 Security in HSR Rings in Substation Automation Systems by Lazaro Energies vol. 10 Issue 2, 2017 https://www.proquest.com/docview/1891401969 (Year: 2017).*

* cited by examiner

*Primary Examiner* — Joseph O Schell
(74) *Attorney, Agent, or Firm* — Fletcher Yoder, P.C.

(57) ABSTRACT

A system includes a parallel redundancy protocol (PRP) link redundancy entity (LRE) configured to receive data and copy the data to create a first copy of the data and a second copy of the data for transmission and a switch configured to cause operation between a first PRP media access control security (MACsec) mode and a second PRP MACsec mode to encrypt the data. The first PRP MACsec mode includes performing MACsec encryption on the data received by the PRP LRE prior to the data being copied by the PRP LRE, and the second PRP MACsec mode includes performing the MACsec encryption on the first copy of the data and the second copy of the data after the data has been copied by the PRP LRE.

20 Claims, 5 Drawing Sheets

SYSTEMS AND METHODS FOR COMMUNICATING DATA SECURELY FOR AN ELECTRIC POWER DELIVERY SYSTEM

BACKGROUND

This disclosure relates to electric power delivery systems. More particularly, this disclosure relates to communicating data securely between devices of an electric power delivery system.

Electric power delivery systems carry electricity from a transmission system to residential communities, factories, industrial areas, and other electricity consumers. An electric power delivery system may include various intelligent electronic devices (IEDs) that may communicate with other devices of the electric power delivery system during operation of the electric power delivery system. For example, an IED may receive and/or transmit a signal and/or data in order to perform a functionality, such as to control a circuit breaker in response to electrical measurements of the electric power delivery system. Unfortunately, it may be difficult to communicate data securely as desired between IEDs. For example, different IEDs may apply data encryption in a different manner or procedure, and it may be difficult to incorporate IEDs that apply different manners of data encryption into an electric power delivery system. Thus, it may be challenging to manufacture and/or operate the electric power delivery system.

DETAILED DESCRIPTION

Figure 1:
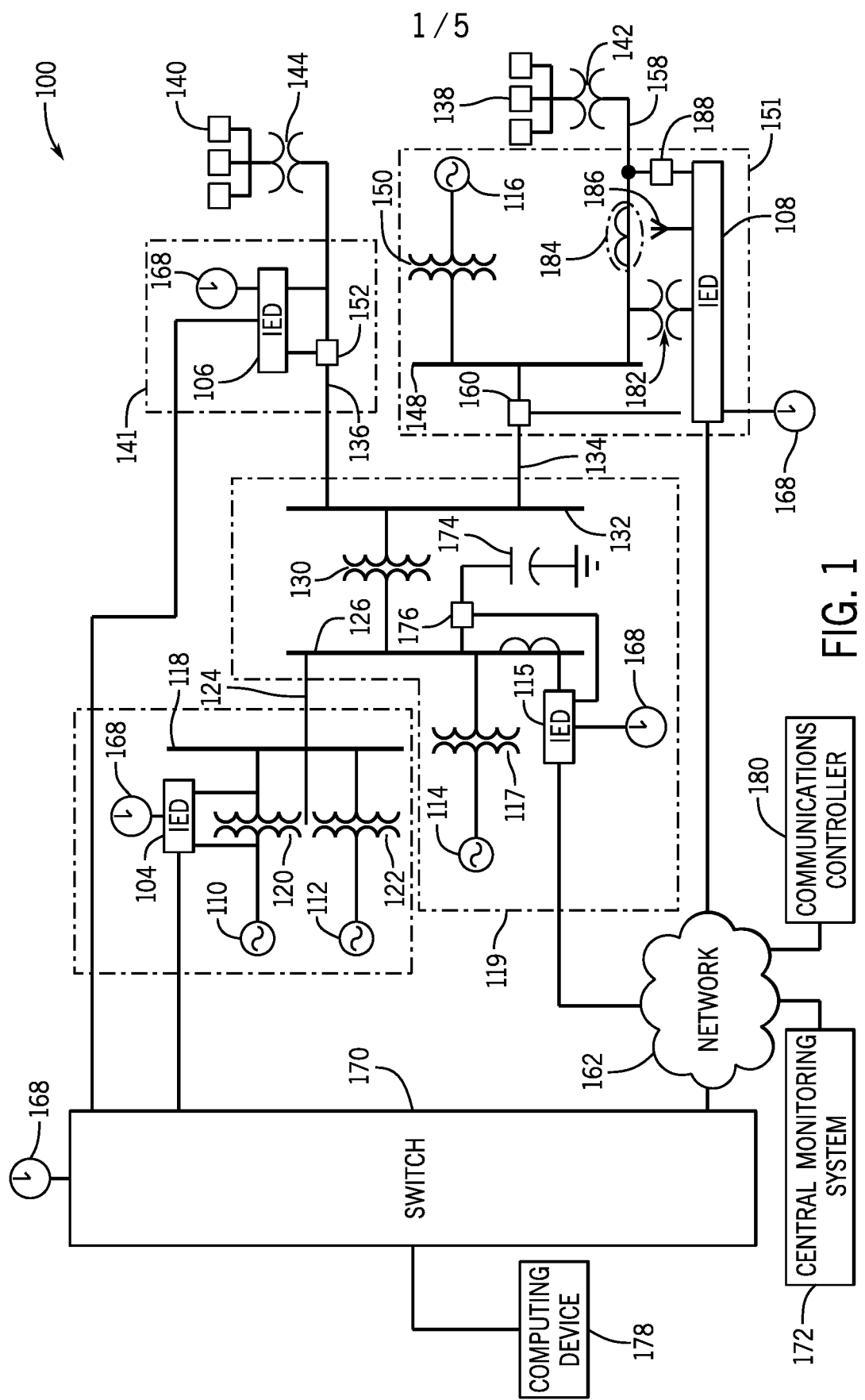
FIG. 1 is a schematic diagram of an electric power delivery system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

The present disclosure relates to communicating data securely between devices of an electric power delivery system or an electric power distribution system. Intelligent electronic devices (IEDs) may be used to control certain devices and to perform certain operations of the electric power delivery system. For example, an IED may be a relay that enables or blocks electrical power flow between other devices of the electric power delivery system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power delivery system. As such, the IEDs may facilitate operation of the electric power delivery system.

Any of the IEDs may use a media access control security (MACsec) communication link and/or a MACsec key agreement (MKA) connectivity association to communicate data. To establish the MACsec communication link, an MKA protocol is used to enable communications between devices of the electric power delivery system. During the MKA protocol, a device that acts as a key server, such as a switch, a controller, or another IED, may select a connectivity association key (CAK) from a set of keys (e.g., a generated set of keys, a received set of keys) and distribute the CAK or a copy of the CAK to an IED via an adoption link (e.g., an Ethernet link, a pre-stored MKA link) established between the device and the IED. An MKA connectivity association may be established between the device and the IED based on verification that the IED possesses the CAK. The device may then select a security association key (SAK) from the set of the keys for distribution to the IED via the MKA connectivity association. The device may retain a copy of the same SAK, and the IED may use its copy of the SAK to establish a MACsec communication link for communicating data. For example, the IED may encrypt data using its copy of the SAK and/or may decrypt encrypted data using its copy of the SAK in order to transmit data securely with another device via the MACsec communication link.

Furthermore, any of the IEDs may use parallel redundancy protocol (PRP) to communicate data. PRP enables copies of data to be communicated in parallel or concurrently with one another through respective data streams, such as via separate networks (e.g., local area networks) having respective components that may operate independently from one another. During data transmission, PRP may be performed to copy data and cause the copies of the data to be transmitted through the respective data streams. During data receipt, PRP may be performed to receive multiple copies of data (e.g., data copied via performance of PRP during transmission of the data), forward the copy of data that was received first, and discard remaining copies of data that are received. Performance of PRP may improve communication of data between IEDs. For example, different sets of devices and components (e.g., switches, controllers) may operate to enable data transmission through the respective data streams for communicating data between IEDs. If a device associated with one of the data streams is unavailable and cannot transmit data (e.g., operation of the device is faulty and/or suspended), data may still be transmitted via operation of the devices of another data stream to enable data to be transmitted between IEDs despite one of the devices being unavailable.

However, operating MACsec data encryption/decryption along with PRP for communicating data may increase a complexity associated with operation of and/or implementation of the IEDs. As an example, during data transmission, certain IEDs may operate in a first PRP MACsec mode in which data is first encrypted using MACsec and PRP is then performed to copy the encrypted data, whereas other IEDs may operate in a second PRP MACsec mode in which PRP is first performed to copy data and PRP is then performed to encrypt copies of the data. Furthermore, recipient IEDs may operate in a PRP MACsec mode corresponding to that of a transmitting IED to decrypt data properly. For example, a recipient IED receiving data from a transmitting IED that operates in the first PRP MACsec mode may also operate in the first PRP MACsec mode to perform PRP first to forward a copy of encrypted data and then use MACsec to decrypt the forwarded copy of the encrypted data. Moreover, a recipient IED receiving data from a transmitting IED that operates in the second PRP MACsec mode may also operate in the second PRP MACsec mode to use MACsec first to decrypt encrypted copies of data and then perform PRP to forward a decrypted copy of the data.

In conventional systems, the IEDs may communicate data using one of such PRP MACsec modes during operation and not another of the PRP MACsec modes. For this reason, each of the IEDs may be implemented to operate in the same PRP MACsec mode. However, arranging all IEDs to operate in the same PRP MACsec mode may increase a complexity associated with implementation of the system. By way of example, it may be tedious and/or costly to purchase each IED and/or program the IEDs in accordance with a single one of the PRP MACsec modes.

Accordingly, embodiments of the present disclosure relate to adjusting an operation of an IED in accordance with a target PRP MACsec mode. In some embodiments, a determination may be made regarding whether a IED is operating in the first PRP MACsec mode or the second PRP MACsec mode to transmit data. Based on the determination, a recipient IED may be operated in a corresponding PRP MACsec mode that matches with that operated by the IED that is transmitting data. Thus, the recipient IED may process (e.g., decrypt, forward, read) the data properly for operation. In this manner, IEDs that operate in different PRP MACsec modes may be implemented in the same system without reducing a performance of MACsec to encrypt and/or decrypt data or reducing a performance of PRP to communicate copies of data. Thus, a flexibility associated with operation and/or manufacture of the system may be increased, and/or a complexity associated with operation and/or manufacture of the system may be reduced.

With the preceding in mind, FIG. 1 is a schematic diagram of an electric power delivery system or an electric power distribution system 100 that may generate, transmit, and/or distribute electric energy to various loads (e.g., different structures). The electric power delivery system 100 may use various IEDs 104, 106, 108, 115 to control certain aspects of the electric power delivery system 100. As used herein, an IED (e.g., the IEDs 104, 106, 108, 115) may refer to any processing-based device that monitors, controls, automates, and/or protects monitored equipment within the electric power delivery system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power delivery system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power delivery system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power delivery system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power delivery system 100 using a communications network 162 and/or using a common time source, such as a Global Navigation Satellite System ("GNSS"), or the like.

The IEDs 104, 106, 108, 115 may be used for controlling various other equipment of the electrical power delivery system 100. By way of example, the illustrated electric power delivery system 100 includes electric generators 110, 112, 114, 116 and power transformers 117, 120, 122, 130, 142, 144, 150. The electric power delivery system 100 may also include electric power lines 124, 134, 136, 158 and/or busses 118, 126, 132, 148 to transmit and/or deliver power, circuit breakers 152, 160, 176 to control flow of power in the electric power delivery system 100, and/or loads 138, 140 to receive the power in and/or from the electric power delivery system 100. A variety of other types of equipment may also be included in the electric power delivery system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the bus 132 (e.g., a distribution bus) via the power transformer 130 (e.g., a step-down transformer). Various electric power lines 136, 134 may be connected to the bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power delivery system 100, the IEDs 104, 106, 108, 115 may transmit data with one another to perform various functionalities for the electric power delivery system 100 by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power delivery system 100 via the switch 170 and/or to send data, such as a user input, to the electric power delivery system 100 via the switch 170. Thus, the switch 170 may enable or block operation of the electric power delivery system 100 via the computing device 178.

A communications controller 180 may interface with equipment in the communications network 162 to create a software-defined network that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

In some embodiments, the switch 170 and the IEDs 104, 106, 108, 115 may communicate with one another via an MKA connectivity association and/or a MACsec communication link or channel. The MACsec communication link may be established via SAKs distributed to enable encryption and/or decryption of data. To this end, the switch 170 or another key device (e.g., a key server) may generate and distribute keys, such as CAKs and/or SAKs, to the IEDs 104, 106, 108, 115 to establish the MKA connectivity association and/or the MACsec communication link. For instance, the switch 170 may establish an MKA connectivity association with one of the IEDs 104, 106, 108, 115 via an MKA protocol that includes establishing an adoption link between the switch 170 and the IED, distributing a CAK to the IED via the adoption link, establishing an MKA connectivity association with the IED based on a verified possession of the CAK, distributing a SAK to the IED via the MKA connectivity association, and communicating data with the IED using the SAK. Indeed, the switch 170 and the IED may use copies of the same SAK to encrypt data to be transmitted as well as to decrypt encrypted data that has been received. Such encrypted data may be transmitted via a MACsec communication link established between the devices to communicate the data securely.

Additionally, the IEDs 104, 106, 108, 115 may communicate with one another using PRP. For example, data transmitted by one of the IEDs 104, 106, 108, 115 may be copied via PRP, and the copies of the data may be transmitted through respective data streams. Another one of the IEDs 104, 106, 108, 115 may receive the copies of the data, and one of the copies of the data (e.g., the copy of the data that was received first) may be forwarded via PRP for further processing. In this manner, if the IED does not receive data being transmitted through one of the data streams (e.g., a device is not successfully operating to transmit data through one of the data streams), the IED may still be able to receive data being transmitted through another data stream. In some embodiments, one of the IEDs 104, 106, 108, 115 may also use MACsec to encrypt data either before PRP is performed or after PRP is performed to transmit data securely. A corresponding one of the IEDs 104, 106, 108, 115 may also use MACsec to decrypt data either before PRP is performed or after PRP is performed based on how data was transmitted using PRP and MACsec. By way of example, circuitry (e.g., software, embedded switch) within one of the IED may operate to determine how PRP and MACsec was performed (e.g., whether PRP was performed before or after MACsec) and may cause the IED receiving the data to perform PRP and MACsec accordingly in order to enable further processing of the data. Thus, the circuitry may selectively cause an IED to perform PRP and MACsec to communicate data securely. Although the present disclosure primarily discusses the use of MKA connectivity associations, MACsec communication links, and PRP to communicate data, any other suitable communication techniques may be used to communicate data between devices of the electric power delivery system 100.

Figure 2:
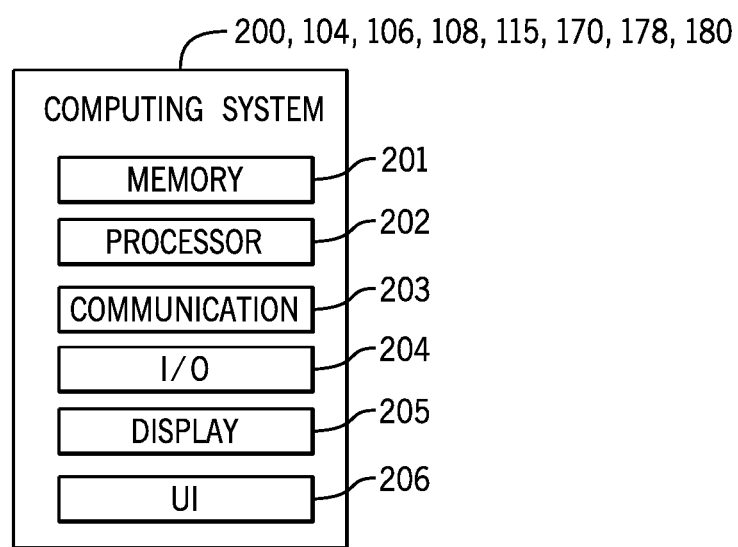
FIG. 2 is a schematic diagram of a computing system that may be incorporated in a device of an electric power delivery system, in accordance with an aspect of the present disclosure.

FIG. 2 is a schematic diagram of an embodiment of a computing system 200 that may be incorporated within a device of the electric power delivery system 100, such as in any of the IEDs 104, 106, 108, 115, the switch 170, the computing device 178, and/or the communications controller 180. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another device of the electric power delivery system 100. That is, the communication system 203 enables the computing system 200 (e.g., of one of the IEDs 104, 106, 108, 115) to communication with another communication system 203 of another computing system 200 (e.g., of the switch 170). Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power delivery system 100, thereby enabling the user to observe an operation, a status, a parameter, other suitable information, or any combination thereof, of the electric power delivery system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
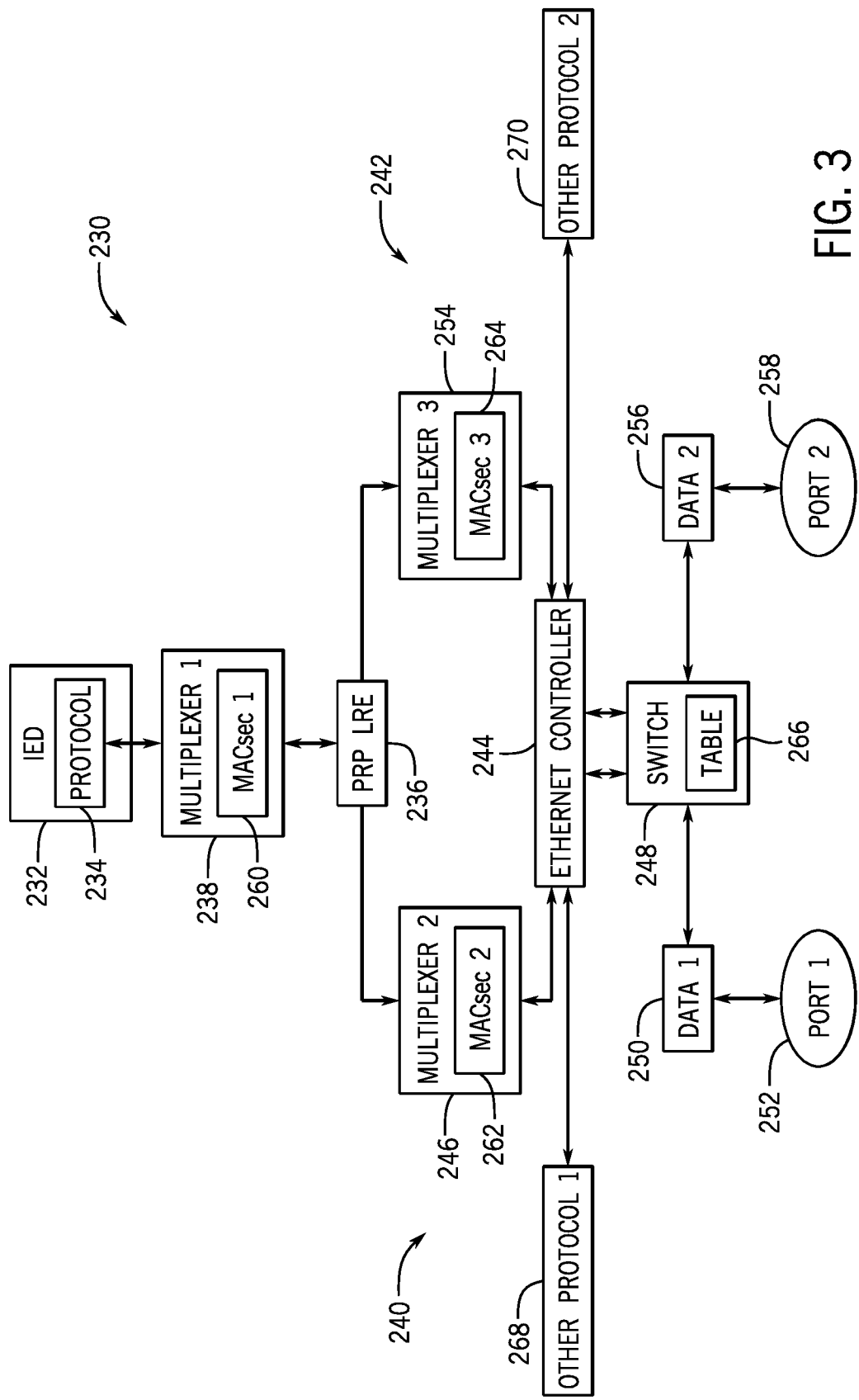
FIG. 3 is a schematic diagram of an IED that communicates data using media access control security (MACsec) data encryption, in accordance with an aspect of the present disclosure.

FIG. 3 is a schematic diagram of an embodiment of circuitry 230 of an IED 232 having PRP and MACsec operation capabilities. During data transmission or egress by the IED 232, in which the IED 232 may transmit data (e.g., a data packet, a data frame), a protocol block 234 (e.g., processing circuitry, software) of the IED 232 may process the data in accordance with a protocol (e.g., Simple Network Time Protocol, Distributed Network Protocol, Telnet, Modbus Transmission Control Protocol, File Transfer Protocol) and transmit the processed data toward a PRP link redundancy entity (LRE) 236 (e.g., processing circuitry, software) of the IED 232 via a first multiplexer 238. The PRP LRE 236 may copy the data received from the protocol block 236 of the IED 232 to create two separate copies of the data, in which a first copy of the data may be transmitted via a first data stream 240 and a second copy of the data may be transmitted via a second data stream 242. The PRP LRE 236 may also associate the copies of the data with a respective identifier (e.g., a tag) to indicate that the copies of the data are created from and duplicates of the same data (e.g., the same data initially transmitted by the protocol block 236) and to associate the data with the respective data streams 240, 242. As described herein, such identifiers may enable the corresponding data 250, 256 to be transmitted to another device accordingly, such as via a corresponding PRP LRE.

An Ethernet controller 244 may receive the first copy of the data via a second multiplexer 246 and transmit the first copy of the data to a switch 248, such as an embedded switch (e.g., switching hardware, an FPGA, a logic block, software subroutine, ASIC, an embedded chip). The switch 248 may then transmit the first copy of the data as first data 250 toward a first port 252 (e.g., a first Ethernet port) to be received by another device (e.g., via a first local area network (LAN)), such as another IED of the electric power delivery system 100. The Ethernet controller 244 may also receive the second copy of the data via a third multiplexer 254 and transmit the second copy of the data to the switch 248, which may transmit the second copy of the data as second data 256 toward a second port 258 (e.g., a second Ethernet port) to be received by the other device (e.g., via a second LAN separate from the first LAN). As an example, each of the first port 252 and the second port 258 may cause a corresponding PRP LRE to receive the data 250, 256 and transmit one of the data 250, 256 to the other device and discard the other of the data 250, 256 (e.g., based on the identifiers associated with the data 250, 256 provided by the PRP LRE 236). Thus, if the other device does not successfully receive one of the data 250, 256 (e.g., due to unexpected operation of a component of one of the LANs), the other device may successfully receive the other of the data 250, 256 (e.g., as a result of operation of the components of the other of the LANs) and operate according to the received data.

Additionally, during data receipt or ingress by the IED 232, in which the IED 232 may receive data (e.g., a data packet, a data frame) from another device, the switch 248 may receive first data 250 (e.g., a first copy of data created by another PRP LRE based on data transmitted by the other device) from the first port 252 via the first data stream 240, and the switch 248 may receive second data 256 (e.g., a second copy of data created by the other PRP LRE based on the data transmitted by the other device) from the second port 258 via the second data stream 242. The switch 248 may transmit the first data 250 to the Ethernet controller 244, and the Ethernet controller 244 may transmit the first data 250 to the PRP LRE 236 via the second multiplexer 246. The switch 248 may also transmit the second data 256 to the Ethernet controller 244, and the Ethernet controller 244 may transmit the second data 256 to the PRP LRE 236 via the third multiplexer 254.

The PRP LRE 236 may transmit one of the first data 250 or the second data 256 to the protocol block 236 of the IED 232 and discard the other of the first data 250 or the second data 256. By way of example, each of the first data 250 and the second data 256 may be associated with an identifier (e.g., provided by a different PRP LRE) that indicates that each of the data 250, 256 are copies of the same data (e.g., the data transmitted by the other device). The PRP LRE 236 may determine whether one of the data 250, 256 has been transmitted to the protocol block 236 based on the identifiers of the data 250, 256. For instance, the PRP LRE 236 may initially receive the first data 250, determine that, based on the identifier of the first data 250, the first data 250 is a copy of data that has not yet been transmitted to the protocol block 236, and transmit the first data 250 to the protocol block 236 in response. The PRP LRE 236 may then receive the second data 256, determine that, based on the identifier of the second data 256, the second data 256 is a copy of data associated with the first data 250 that has already been transmitted to the protocol block 236, and discard the second data 256 rather than transmit the second data 256 to the protocol block 236 in response. Thus, the PRP LRE 236 may block the protocol block 236 from receiving duplicate copies of the same data transmitted by the other device.

MACsec encryption may also be performed on data being transmitted from and/or being received by the IED 232. By way of example, different PRP MACsec modes may be operated to encrypt and copy data for transmission or to decrypt copies of data for receipt. In an example, for a first PRP MACsec mode (e.g., MACsec-before-PRP), during data transmission, a first MACsec function block 260 (e.g., a first FPGA) may perform MACsec encryption on data initially transmitted by the IED 232 to encrypt the data. The PRP LRE 236 may receive the encrypted data, copy the encrypted data, and associate the encrypted data with respective identifiers for subsequent transmission via the data streams 240, 242. As such, during operation in the first PRP MACsec mode to transmit data, the identifiers associated with the copies of the data may not be MACsec encrypted. In another example, for a second PRP MACsec mode (e.g., PRP-before-MACsec), during data transmission, the PRP LRE 236 may receive the initial data transmitted by the protocol block 236 (e.g., without the data being encrypted), copy the data to create the first copy of the data and the second copy of the data, and associate the copies of the data with respective identifiers. A second MACsec function block 262 (e.g., a second FPGA) may then perform MACsec encryption on the first copy of the data, including on the identifier associated with the first copy of the data, and a third MACsec function block 264 (e.g., a third FPGA) may perform MACsec encryption on the second copy of the data, including on the identifier associated with the second copy of the data. Therefore, during operation in the second PRP MACsec mode to transmit data, the identifiers associated with the copies of the data may be MACsec encrypted.

In this manner, encrypted data being transmitted during the first PRP MACsec mode (e.g., in which the identifiers associated with data are not MACsec encrypted) may be different from encrypted data being transmitted during the second PRP MACsec mode (e.g., in which the identifiers associated with data are MACsec encrypted), even though the same MACsec encryption operation, such as data encryption using the same SAK, may be performed. For this reason, a corresponding PRP MACsec mode is to be operated by a recipient device in order to decrypt the encrypted data properly for further processing and corresponding operation. By way of example, the corresponding PRP MACsec mode may be operated to decrypt data based on whether the identifiers associated with the data are encrypted. For instance, when data is being encrypted via the first PRP MACsec mode for transmission to the IED 232 (e.g., identifiers associated with the data are not being encrypted), the first PRP MACsec mode may also be operated for receipt of such data to enable the PRP LRE 236 to receive the data and process the identifiers (e.g., unencrypted identifiers) to transmit the data to the IED 232. Further, when data is being encrypted via the second PRP MACsec mode for transmission to the IED 232 (e.g., identifiers associated with the data are being encrypted), the second PRP MACsec mode may also be operated for receipt of such data to enable the PRP LRE 236 to receive the data and process the identifiers (e.g., decrypted identifiers) to transmit the data to the protocol block 236. Thus, a PRP MACsec mode may be suitably selected and operated for data transmission and/or for data receipt.

In some embodiments, the switch 248 may effectuate operation of the PRP MACsec modes. For instance, each of the multiplexers 238, 246, 254 may enable or block operation of a corresponding MACsec function block 260, 262, 264. In the illustrated embodiment, the first multiplexer 238 enables or blocks operation of the first MACsec function block 260 to perform MACsec encryption of data (e.g., prior to transmitting data to the PRP LRE 236), the second multiplexer 246 enables or blocks operation of the second MACsec function block 260 to perform MACsec encryption of data (e.g., a first copy of data created by the PRP LRE 236), and the third multiplexer 254 enables or blocks operation of the third MACsec function block 264 to perform MACsec encryption of data (e.g., a second copy of data created by the PRP LRE 236). The switch 248 may cause operation of the multiplexers 238, 246, 254 to perform MACsec encryption in accordance with a selected PRP MACsec mode in operation.

By way of example, during the first PRP MACsec mode, the switch 248 may cause the first multiplexer 238 to transmit data from the IED 232 to the first MACsec function block 260, and the switch 248 may cause the second multiplexer 246 and the third multiplexer 254 to transmit copies of data created by the PRP LRE 236 to bypass the second MACsec function block 262 and the third MACsec function block 264. As such, MACsec encryption is performed via the first MACsec function block 260 on the data transmitted by the IED 232 (e.g., prior to receipt by the PRP LRE 236), and MACsec encryption is not performed via the second and third MACsec function blocks 262, 264 on the copies of data created by the PRP LRE 236. Furthermore, during the second PRP MACsec mode, the switch 248 may cause the first multiplexer 238 to transmit data received from the IED 232 to bypass the first MACsec function block 260, and the switch 248 may cause the second multiplexer 246 and the third multiplexer 254 to transmit copies of data created by the PRP LRE 236 to the second MACsec function block 262 and the third MACsec function block 264, respectively. Thus, MACsec encryption is not performed via the first MACsec function block 260 on the data transmitted by the IED 232 (e.g., prior to receipt by the PRP LRE 236), and MACsec encryption is performed via the second and third MACsec function blocks 262, 264 on the copies of the data created by the PRP LRE 236.

Additional or alternative protocols may be performed on data being communicated with the IED 232. In certain embodiments, protocols may be performed on the data 250, 256 during transmission via the data streams 240, 242, respectively. As an example, certain protocols (e.g., Precision Time Protocol, MACsec) may be performed on the first data 250 at the physical layer (PHY), such as the Ethernet PHY, associated with the first data stream 240. Certain protocols may also be performed on the second data 256 at the PHY associated with the second data stream 242. Such protocols may be performed on the data 250, 256 between the switch 248 and the ports 252, 258 in some embodiments. That is, the protocols may be performed on the data 250, 256 after being output from the switch 248 toward the respective ports 252, 258 during data transmission, and/or the protocols may be performed on the data 250, 256 prior to being received by the switch 248 during data receipt. Additionally or alternatively, the Ethernet controller 244 may transmit the data 250, 256 to perform other protocols, such as for a first additional protocol 268 (e.g., a first LAN dependent protocol) to be performed on the first data 250 and/or a second additional protocol 270 (e.g., a second LAN dependent protocol) to be performed on the second data 256. Indeed, any suitable protocol may be performed on the data 250, 256 during data transmission and/or data receipt via the IED 232. Further still, although the illustrated circuitry 230 includes two data streams 240, 242, additional or alternative circuitry may include any suitable number of data streams through which data may be transmitted, such as a number of data streams based on the operation of the PRP LRE 236 to copy data.

In some embodiments, the switch 248 may determine the PRP MACsec mode for operation based on received data. As an example, during data receipt from another device, the switch 248 may determine the PRP MACsec mode that was used to transmit the data to the IED 232 based on information included in the received data (e.g., of the data 250, 256). For example, the data may include a data frame. The switch 248 may analyze the data frame to determine whether the data frame includes a PRP redundancy check trailer for determining whether the data is to be forwarded to the protocol block 234 or discarded. The switch 248 may also determine the placement or location of the PRP redundancy check trailer within the data frame in order to determine the PRP MACsec mode associated with the data.

The switch 248 may then cause operation of the same PRP MACsec mode to transmit data from the IED 232 to the other device. The switch 248 may also include or otherwise access a table 266 (e.g., a PRP node table), such as a database table or lookup table, that associates devices with corresponding respective PRP MACsec modes. The table 266 may, for example, include information regarding different devices (e.g., different IEDs), such as whether each device is using multiple data streams to communicate data (e.g., for a doubly attached node) or is using a single data stream to communicate data (e.g., for a singly attached node), and such information may be referred to for determining suitable communication of data between different devices. The switch 248 may update (e.g., expand) the table 266 to include information that associates a specific device with a respective PRP MACsec mode (e.g., the same PRP MACsec mode used to transmit the data from the specific device to the IED 232) determined based on the format of the data received from the specific device. During data transmission to the specific device, the switch 248 may refer to the table 266 to identify the PRP MACsec mode associated with the specific device and cause operation in accordance with the identified PRP MACsec mode. Such operation of the switch 248 may cause a suitable PRP MACsec mode to be operated automatically (e.g., without having to manually program or otherwise modify a device) to enable data communication between devices. Indeed, the switch 248 may enable devices (e g, IEDs) that may operate in different PRP MACsec modes to communicate with one another. Further, the switch 248 may enable a user to program, select, or configure one of the devices to operate in a specific PRP MACsec mode without having to manually program or configure a remainder of the electric power delivery system 100 (e.g., other devices of the electric power delivery system 100) to operate in a corresponding PRP MACsec mode to communicate data. Therefore, the switch 248 may improve ease of installation and/or operation of devices of the electric power delivery system 100.

Although each of the components illustrated in FIG. 3 is included in the IED 232 in the illustrated embodiment, in additional or alternative embodiments, any of the components may be separate from the IED 232. That is, any of the components may not be a part of the circuitry 230. For example, the circuitry 230 of the IED 232 may operate in conjunction with a separate PRP LRE, a separate Ethernet controller, a separate switch, and so forth, in order to communicate data.

Each of FIGS. 4-6 described below illustrates a method associated with an operation associated with PRP MACsec modes. In some embodiments, each of the methods may be performed by a single respective component or system, such as by the computing system 200 (e.g., the processor 202). In additional or alternative embodiments, multiple components or systems may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such as at the same time and/or in response to one another.

Figure 4:
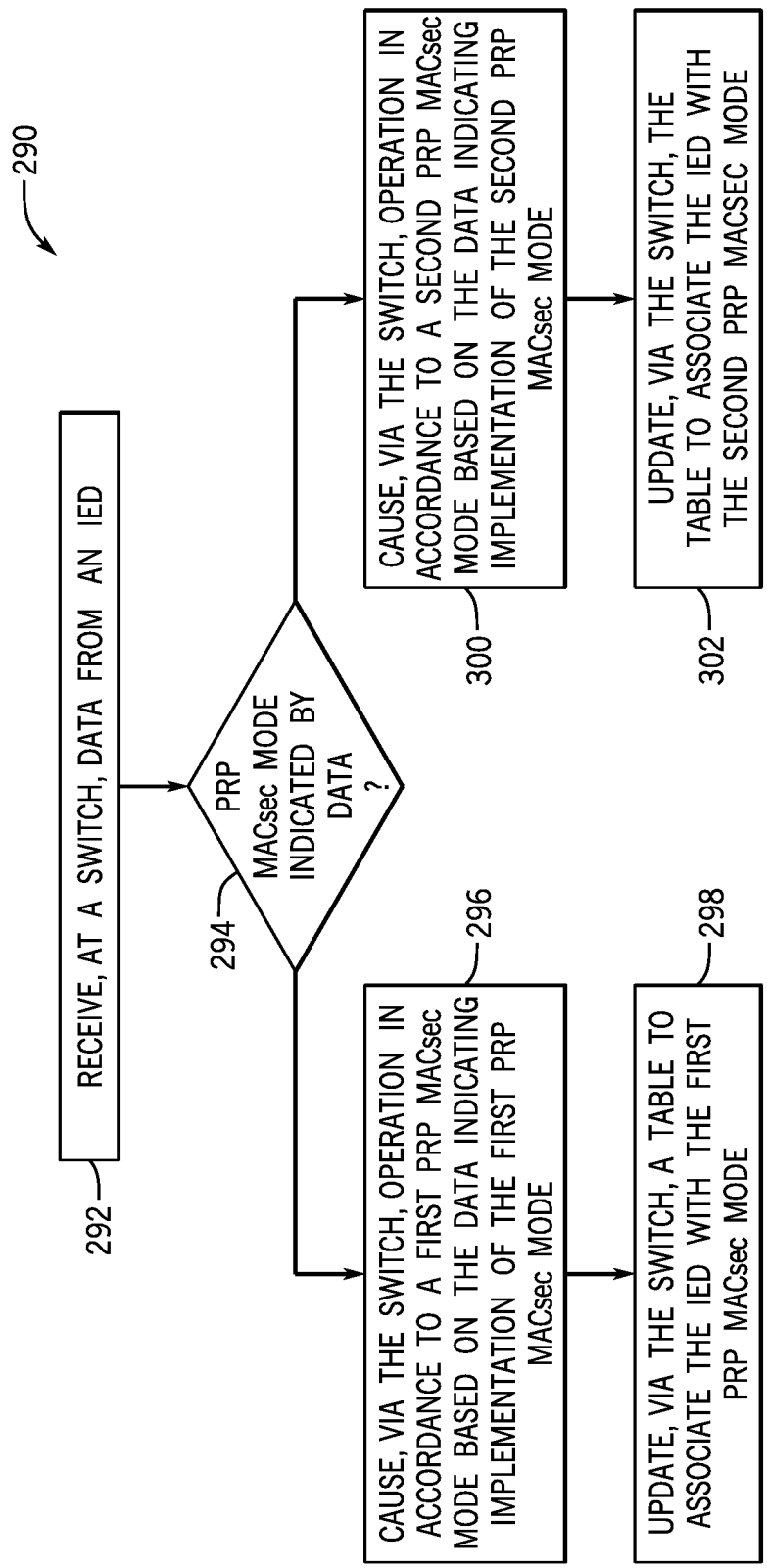
FIG. 4 is a flowchart of a method for communicating data for an electric power delivery system using MACsec operations, in accordance with an aspect of the present disclosure.

FIG. 4 is a flowchart of an embodiment of a method 290 for operating a system (e.g., the circuitry 230) in a PRP MACsec mode via the switch 248. At block 292, the switch 248 may receive data from an IED (e.g., any of the IEDs 104, 106, 108, 115, 232). By way of example, the switch 248 may receive copies of the same data from the IED, such as via the first port 252 and the second port 258. Such data may include a data packet, a data frame, and the like. At block 294, the switch 248 may analyze the data received from the IED For example, the switch 248 may analyze the format of the data in order to determine the PRP MACsec mode used for transmitting the data from the IED At block 296, based on the data indicating that a first PRP MACsec mode was implemented to transmit the data from the IED to the switch 248, the switch 248 may cause operation in accordance with the first PRP MACsec mode. For example, the first PRP MACsec mode may include performing MACsec encryption prior to copying data via the PRP LRE 236 during data transmission. The switch 248 may therefore cause decryption of data received from the IED in accordance with the first PRP MACsec mode to enable further processing of data (e.g., transmission of copies of data via another PRP LRE, operating based on reading the data). Furthermore, the switch 248 may cause encryption of data being transmitted to the IED in accordance with the first PRP MACsec mode to enable the IED to process the data in accordance with the first PRP MACsec mode. For instance, the switch 248 may cause operation of a multiplexer to transmit the data to a MACsec function block that may perform MACsec encryption on the data prior to the data being copied by the PRP LRE 236. The switch 248 may also cause operation of multiplexers to transmit copies of the data received from the PRP LRE 236 to bypass MACsec function blocks to avoid performing MACsec encryption on the copies of the data. Additionally, at block 298, the switch 248 may update a table (e.g., the table 266), such as a PRP node table, to associate the IED with the first PRP MACsec mode based on the indication that a first PRP MACsec mode was implemented to transmit the data from the IED to the switch 248. Thus, for subsequent data communications with the IED, the switch 248 may operate in accordance with the first PRP MACsec mode as indicated by the table.

However, at block 300, based on the data indicating that a second PRP MACsec mode was implemented to transmit the data from the IED to the switch 248, the switch 248 may cause operation in accordance with the second PRP MACsec mode. The second PRP MACsec mode may include performing MACsec encryption after data has been copied via the PRP LRE 236 during data transmission. Thus, the switch 248 may cause decryption of data received from the IED in accordance with the second PRP MACsec mode to enable further processing of the data. The switch 248 may also cause encryption of data being transmitted to the IED in accordance with the second PRP MACsec mode to enable the IED to process the data in accordance with the second PRP MACsec mode. That is, the switch 248 may cause operation of a multiplexer to transmit the data to bypass a MACsec function block to avoid performing MACsec encryption on the data prior to the data being copied by the PRP LRE 236. The switch 248 may also cause operation of multiplexers to transmit copies of the data received from the PRP LRE 236 to MACsec function blocks that may perform MACsec encryption on copies of the data. At block 302, the switch 248 may update the table to associate the IED with the second PRP MACsec mode based on the indication that the second PRP MACsec mode was implemented to transmit the data from the IED to the switch 248. Thus, the switch 248 may operate in accordance with the second PRP MACsec mode indicated by the table to communicate data with the IED.

In some embodiments, the method 290 may be continually performed during operation of the switch 248. In other words, the switch 248 may continually (e.g., at a particular frequency) monitor data received from the IED and determine the PRP MACsec mode being used to transmit the data to the switch 248 to operate accordingly. Thus, the switch 248 may detect a change in the PRP MACsec mode associated with the IED and update the operations and the table based on the change in the PRP MACsec mode. As an example, the switch 248 may initially operate in accordance with the first PRP MACsec mode (e.g., based on an initial indication that data received from the IED is being transmitted in accordance with the first PRP MACsec mode) to communicate data with the IED, and the table may initially associate the IED with the first PRP MACsec mode. However, the switch 248 may subsequently receive an indication that data received from the IED is being transmitted in accordance with the second PRP MACsec mode. As a result, the switch 248 may automatically adjust to communicate data with the IED in accordance with the second PRP MACsec mode instead the first PRP MACsec mode and update the table to associate the IED with the second PRP MACsec mode instead of with the first PRP MACsec mode.

Furthermore, the switch 248 may perform the method 290 for multiple different IEDs. That is, for each IED, the switch 248 may determine a corresponding PRP MACsec mode for operation based on received data and update the table to associate the IEDs with corresponding, respective PRP MACsec modes. As such, the switch 248 may reference the table to determine and implement the corresponding, respective PRP MACsec modes for communicating data with the IEDs.

Figure 5:
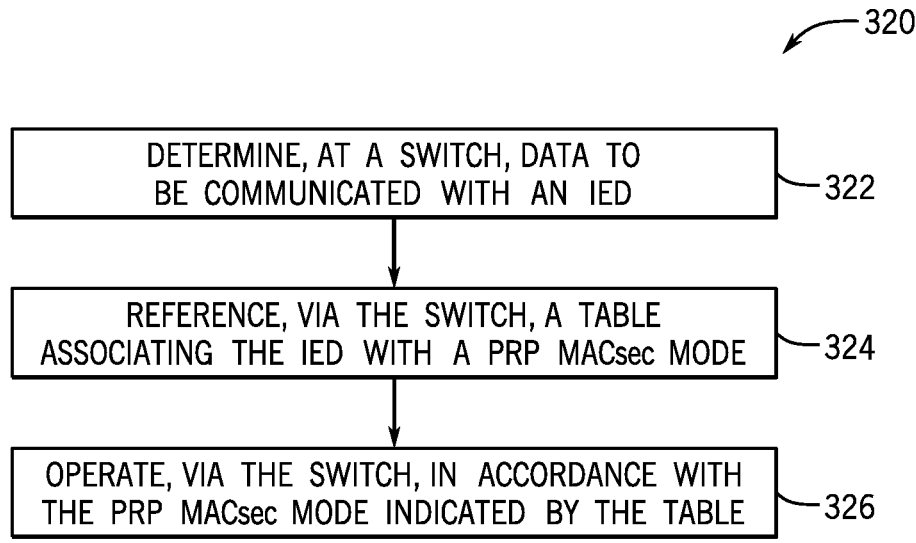
FIG. 5 is a flowchart of a method for communicating data for an electric power delivery system using MACsec operations, in accordance with an aspect of the present disclosure.

FIG. 5 is a flowchart of an embodiment of a method 320 for operating a system (e.g., the circuitry 230) in a PRP MACsec mode via the switch 248. At block 322, the switch 248 may determine data to be communicated with an IED As an example, the switch 248 may analyze the data (e.g., a frame of the data) to determine that the data is received from the IED and is to be transmitted to another device (e.g., another IED). As another example, the switch 248 may receive data from another device (e.g., another IED) and analyze the data to determine that the data is to be transmitted to the IED At block 324, the switch 248 may reference a table that associates the IED with a PRP MACsec mode. The table may be updated, for example, based on performance of the block 298 and/or the block 302 of the method 290 to associate the IED with the first PRP MACsec mode or the second PRP MACsec mode, respectively. That is, the table may associate the IED with a PRP MACsec mode based on a previous communication of data with the IED (e.g., a previous PRP MACsec mode to communicate data).

At block 326, the switch 248 may operate in accordance with the PRP MACsec mode associated with the IED as indicated by the table. For example, the switch 248, in accordance with the first PRP MACsec mode, may cause operation of multiplexers to perform MACsec encryption on data prior to the PRP LRE 236 copying the data, and the switch 248, in accordance with the second PRP MACsec mode, may cause operation of multiplexers to perform MACsec encryption on data after the data has been copied by the PRP LRE 236. Indeed, the switch 248 may operate in accordance with the PRP MACsec mode indicated by the table to enable suitable communication of data between the IED and another device.

Figure 6:
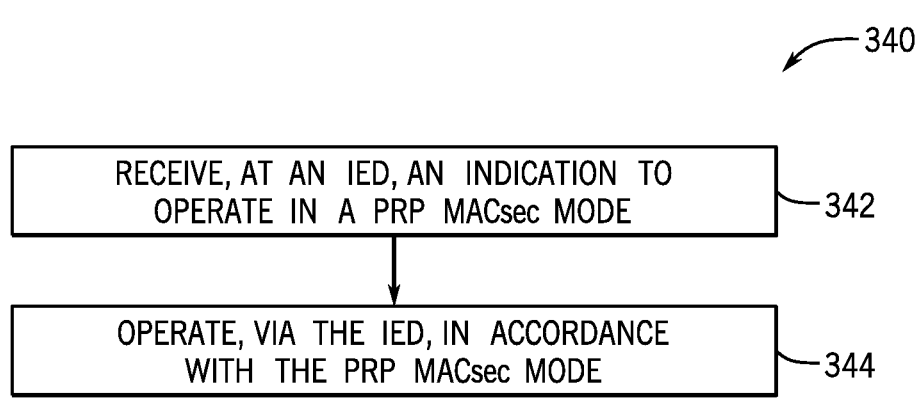
FIG. 6 is a flowchart of a method for communicating data for an electric power delivery system using MACsec operations, in accordance with an aspect of the present disclosure.

FIG. 6 is a flowchart of an embodiment of a method 340 for operating an IED (e.g., any of the IEDs 104, 106, 108, 115, 232) in accordance with a PRP MACsec mode. At block 342, the IED may receive an indication to operate in a PRP MACsec mode, such as the first PRP MACsec mode or the second PRP MACsec mode described above. In some embodiments, the indication may include programming, adjustment, or other manual configuration of the IED to operate in the PRP MACsec mode. In additional or alternative embodiments, the indication may include a user input, such as an interaction with a feature (e.g., the UI 206) of the IED. At block 344, the IED may operate in accordance with the PRP MACsec mode.

Operation of the switch 248 to perform the method 290 and/or the method 320 may enable the user to select any of the PRP MACsec modes for operation by the IED. For example, the switch 248 may determine the PRP MACsec mode being operated by the IED as selected by the user and cause corresponding devices in communication with the IED to operate in accordance with the same PRP MACsec mode (e.g., by adjusting operations of the devices communicating data with the IED). As such, the switch 248 may enable the IED to communicate with any device regardless of a current PRP MACsec mode being implemented by the device. Thus, the switch 248 may enable the IED to communicate data using any of the PRP MACsec modes (e.g., as indicated by the user).

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
   a parallel redundancy protocol (PRP) link redundancy entity (LRE) configured to receive data and copy the data to create a first copy of the data and a second copy of the data for transmission; and
   a switch configured to cause an operation of a first PRP media access control security (MACsec) mode and a second PRP MACsec mode to encrypt the data, wherein the first PRP MACsec mode comprises performing MACsec encryption on the data received by the PRP LRE prior to the data being copied by the PRP LRE, and the second PRP MACsec mode comprises performing the MACsec encryption on the first copy of the data and the second copy of the data after the data has been copied by the PRP LRE.

2. The system of claim 1, wherein the switch is configured to cause operation of the first PRP MACsec mode by causing a first multiplexer to enable the MACsec encryption to be performed on the data prior to the data being copied by the PRP LRE and causing a second multiplexer and a third multiplexer to transmit the first copy of the data and the second copy of the data, respectively, without the MACsec encryption being performed on the first copy of the data and the second copy of the data to avoid performing the MACsec encryption on the data after the data has been copied by the PRP LRE.

3. The system of claim 1, wherein the switch is configured to cause operation of the second PRP MACsec mode by causing a first multiplexer to transmit the data to the PRP LRE without the MACsec encryption being performed on the data to avoid performing the MACsec encryption on the data prior to the data being copied by the PRP LRE and causing a second multiplexer and a third multiplexer to enable the MACsec encryption to be performed on the first copy of the data and the second copy of the data, respectively, after the data has been copied by the PRP LRE.

4. The system of claim 1, wherein the switch is configured to perform operations comprising:
   determining the data received by the PRP LRE is to be transmitted to an intelligent electronic device (IED) of an electric power delivery system;
   determining a previous PRP MACsec mode used to communicate data with the IED; and
   causing operation of the first PRP MACsec mode or the second PRP MACsec mode to encrypt the data based on the previous PRP MACsec mode.

5. The system of claim 4, wherein the switch is configured to perform operations comprising:
   causing operation of the first PRP MACsec mode based on the previous PRP MACsec mode being the first PRP MACsec mode; and
   causing operation of the second PRP MACsec mode based on the previous PRP MACsec mode being the second PRP MACsec mode.

6. The system of claim 4, wherein the switch is configured to perform operations comprising:
   referencing a table associating IEDs of the electric power delivery system with corresponding respective PRP MACsec modes; and
   causing operation of the first PRP MACsec mode or the second PRP MACsec mode to encrypt the data based on the corresponding respective PRP MACsec mode associated with the IED as indicated by the table.

7. The system of claim 1, wherein the switch is configured to receive the first copy of the data and the second copy of the data transmitted by the PRP LRE.

8. A non-transitory computer-readable medium comprising a memory or disk comprising instructions, wherein the instructions, when executed by processing circuitry, are configured to cause the processing circuitry to perform operations comprising:
receiving first data from an intelligent electronic device (IED) of an electric power delivery system;
determining a parallel redundancy protocol (PRP) media access control security (MACsec) mode used to encrypt the first data received from the IED;
determining second data to be transmitted to the IED; and
causing operation in the PRP MACsec mode to encrypt the second data to be transmitted to the IED.

9. The non-transitory computer-readable medium of claim 8, wherein the PRP MACsec mode comprises a first PRP MACsec mode or a second PRP MACsec mode, the first PRP MACsec mode comprises encrypting data prior to the data being copied by a PRP link redundancy entity (LRE), and the second PRP MACsec mode comprises encrypting the data after the data has been copied by the PRP LRE.

10. The non-transitory computer-readable medium of claim 9, wherein the instructions, when executed by the processing circuitry, are configured to cause the processing circuitry to perform operations comprising:
causing a multiplexer to enable MACsec encryption of the second data prior to the PRP LRE receiving the second data during the first PRP MACsec mode; and
causing the multiplexer to bypass the MACsec encryption of the second data prior to the PRP LRE receiving the second data during the second PRP MACsec mode.

11. The non-transitory computer-readable medium of claim 10, wherein the instructions, when executed by the processing circuitry, are configured to cause the processing circuitry to cause the multiplexer to transmit the second data to bypass additional circuitry configured to perform the MACsec encryption to avoid the MACsec encryption of the second data prior to the PRP LRE receiving the second data during the second PRP MACsec mode.

12. The non-transitory computer-readable medium of claim 8, wherein the instructions, when executed by the processing circuitry, are configured to cause the processing circuitry to update a table to associate the IED with the PRP MACsec mode in response to determining the PRP MACsec mode used to encrypt the first data.

13. The non-transitory computer-readable medium of claim 12, wherein the instructions, when executed by the processing circuitry, are configured to cause the processing circuitry to perform operations comprising:
determining the second data to be transmitted to the IED;
referencing the table to identify the PRP MACsec mode associated with the IED; and
causing the operation in the PRP MACsec mode to encrypt the second data as indicated by the table.

14. The non-transitory computer-readable medium of claim 8, wherein the instructions, when executed by the processing circuitry, are configured to cause the processing circuitry to decrypt the first data in accordance with the PRP MACsec mode upon receiving the first data from the IED.

15. A first intelligent electronic device (IED), comprising:
a switch configured to perform operations comprising:
determining a second IED configured to receive data transmitted by the first IED;
identifying, based on the second IED, a parallel redundancy protocol (PRP) media access control security (MACsec) mode to encrypt the data transmitted by the first IED to the second IED; and
operating in accordance with the PRP MACsec mode.

16. The first IED of claim 15, wherein the switch is configured to perform operations comprising:
referencing a table associating IEDs with corresponding respective PRP MACsec modes; and
operating in accordance with the PRP MACsec mode associated with the second IED based on the table.

17. The first IED of claim 16, wherein the PRP MACsec mode comprises a first PRP MACsec mode or a second PRP MACsec mode, the first PRP MACsec mode comprises copying data via a PRP link redundancy entity (LRE) after performing MACsec encryption on the data, and the second PRP MACsec mode comprises copying data via the PRP LRE prior to performing the MACsec encryption on the data.

18. The first IED of claim 15, comprising a PRP LRE configured to copy the data being transmitted by the first IED to create a first copy of the data and a second copy of the data, and transmit the first copy of the data and the second copy of the data toward the switch.

19. The first IED of claim 18, wherein the switch is configured to perform operations comprising:
receiving additional data from the second IED;
transmitting the additional data to the PRP LRE; and
operating in accordance with the PRP MACsec mode to decrypt the additional data.

20. The first IED of claim 15, comprising circuitry configured to perform operations comprising:
distributing a connectivity association key (CAK) to the second IED;
establishing a MACsec key agreement (MKA) connectivity association upon verification of the second IED possessing the CAK; and
distributing a security association key (SAK) to the second IED via the MKA connectivity association, wherein the data transmitted by the second IED is encrypted via the SAK.

* * * * *